US009082417B2

(12) United States Patent
Neo et al.

(10) Patent No.: US 9,082,417 B2
(45) Date of Patent: Jul. 14, 2015

(54) OPTICAL INFORMATION RECORDING APPARATUS AND OPTICAL INFORMATION RECORDING METHOD

(71) Applicants: Hitachi-LG Data Storage, Inc., Tokyo (JP); Hitachi Consumer Electronics Co., Ltd., Yokohama, Kanagawa (JP)

(72) Inventors: Atsushi Neo, Tokyo (JP); Junya Ilzuka, Tokyo (JP); Yusuke Nakamura, Tokyo (JP); Kazuyuki Tajima, Tokyo (JP)

(73) Assignees: HITACHI-LG DATA STORAGE, INC., Tokyo (JP); HITACHI CONSUMER ELECTRONICS CO., LTD., Kanagawa (JP)

( * ) Notice: Subject to any disclaimer, the term of this patent is extended or adjusted under 35 U.S.C. 154(b) by 0 days.

(21) Appl. No.: 14/452,599

(22) Filed: Aug. 6, 2014

(65) Prior Publication Data
US 2015/0085633 A1 Mar. 26, 2015

(30) Foreign Application Priority Data
Sep. 20, 2013 (JP) .................................. 2013-194814

(51) Int. Cl.
G11B 7/0065 (2006.01)
G11B 7/1353 (2012.01)
G11B 7/128 (2012.01)
G11B 7/00 (2006.01)

(52) U.S. Cl.
CPC .............. *G11B 7/0065* (2013.01); *G11B 7/128* (2013.01); *G11B 7/1353* (2013.01); *G11B 2007/0009* (2013.01)

(58) Field of Classification Search
None
See application file for complete search history.

(56) References Cited

U.S. PATENT DOCUMENTS

2009/0316558 A1* 12/2009 Hashimoto et al. ........... 369/103
2013/0142025 A1    6/2013 Nakamura

FOREIGN PATENT DOCUMENTS

WO    2007/111139 A1    10/2007

* cited by examiner

*Primary Examiner* — Wayne Young
*Assistant Examiner* — Brian Butcher
(74) *Attorney, Agent, or Firm* — Baker Botts L.L.P.

(57) ABSTRACT

An optical information recording apparatus configured to record information into an information recording medium by using holography, the apparatus including: a signal generation unit configured to generate two-dimensional data; and a two-dimensional spatial light modulator unit configured to display the two-dimensional data and to spatially modulate a transmitted or reflected beam, wherein the two-dimensional spatial light modulator unit includes a signal region and an external region, the signal region displays two-dimensional data based on user data, the external region displays two-dimensional data not including the user data, and the signal generation unit generates two-dimensional data in such a manner that a frequency of the two-dimensional data displayed on the external region becomes equal to or larger than a frequency of the two-dimensional data displayed on the signal region.

16 Claims, 16 Drawing Sheets

OPTICAL INFORMATION RECORDING APPARATUS AND OPTICAL INFORMATION RECORDING METHOD

CROSS-REFERENCE TO RELATED APPLICATIONS

This application claims the priority of Japanese Patent Application No. 2013-194814, filed on Sep. 20, 2013, which is incorporated herein by reference in its entirety.

BACKGROUND OF THE INVENTION

1. Field of the Invention

The present invention relates to an optical information recording apparatus and an optical information recording method.

2. Description of the Related Art

As a related art in the present technical field, there is JP-2010-3358-A. In this bulletin, it is described that "in an optical information recording/recovering apparatus which records information by using holography, a problem can be solved by an optical information recording apparatus and method including a signal generation unit configured to generate two-dimensional data by a two-dimensional encoding method, in which a lower limit of the number of successive on/off pixels in an array of pixels in one direction in a two-dimensional spatial light modulator is K (K≥2, K: natural number), and a pickup configured to record the two-dimensional data generated by the signal generation unit into a hologram disc".

SUMMARY OF THE INVENTION

Recording in a hologram apparatus is performed by making a spatial light modulator reflect or transmit a coherent beam, making a signal beam modulated spatially in response to two-dimensional data and a reference beam of the coherent beam interfere with each other through an objective lens in an optical information recording medium, and polymerizing a photosensitive monomer of the optical information recording medium in an interference fringe bright part.

Here, since an objective lens generally includes a substantially circular shape, user data including a substantially circular shape is displayed efficiently on the spatial light modulator (hereinafter, region which is on spatial light modulator and displays two-dimensional data based on user data will be referred to as signal region). However, since the spatial light modulator is often quadrangle, there is a region, which displays two-dimensional data not including user data, on the spatial light modulator. The area is called an external region.

When a reflected beam or transmitted beam of a coherent beam from the external region reaches a hologram medium, a photosensitive monomer to record an interference fringe is consumed unnecessarily (hereinafter, reflected beam or transmitted beam of coherent beam from external region will be referred to as external beam). Thus, to perform recording of larger capacity, it is necessary to block or suppress the external beam to prevent a hologram disc from being exposed. However, in JP-2010-3358-A, this point is not considered.

Thus, in the present invention, by suppressing consumption of a photosensitive monomer of a hologram disc, a hologram apparatus which realizes large capacity is provided.

To solve the problem above, in the present invention, a configuration described in claims is used as an example.

According to the present invention, an optical information recording apparatus and an optical information recording method which make it possible to suppress consumption of a photosensitive monomer of a hologram disc to make large capacity possible, can be provided.

A problem, a configuration, and an effect other than what has been described will be demonstrated according to the following embodiments.

DESCRIPTION OF THE PREFERRED EMBODIMENTS

In the following, embodiments will be described with reference to the drawings.

First Embodiment

Figure 2:
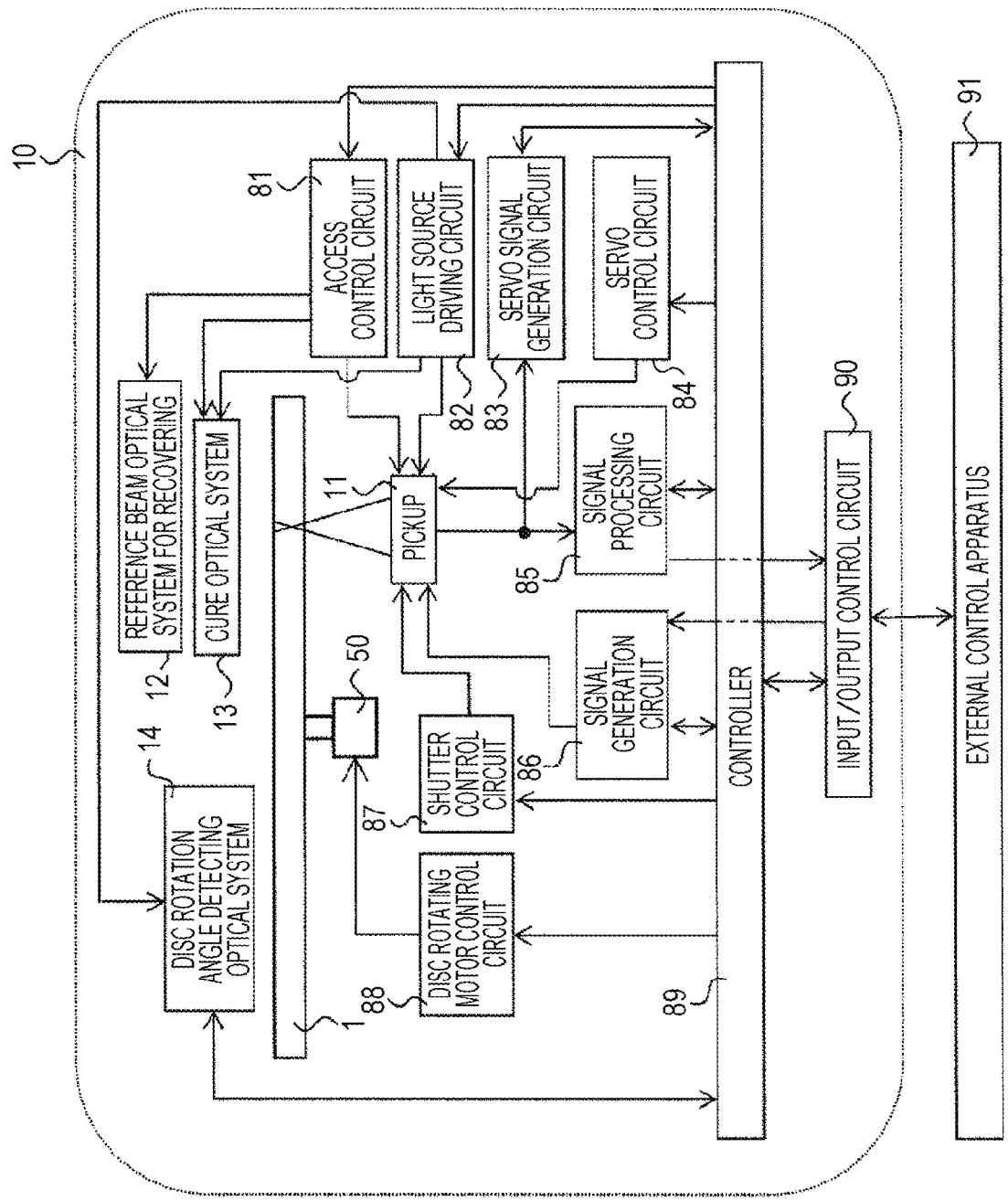
FIG. 2 is a block diagram of the optical information recording/recovering apparatus.

An embodiment of the present invention will be described with reference to the attached drawings. FIG. 2 is a block diagram illustrating a recording/recovering apparatus, which records/recovers digital information by using holography, of an optical information recording medium.

An optical information recording/recovering apparatus 10 is connected to an external control apparatus 91 through an input/output control circuit 90. In a case of recording, the optical information recording/recovering apparatus 10 receives an information signal to be recorded from an external control apparatus 91 through the input/output control circuit 90. In a case of recovering, the optical information recording/recovering apparatus 10 transmits a recovered information signal to the external control apparatus 91 through the input/output control circuit 90.

The optical information recording/recovering apparatus 10 includes a pickup 11, a reference beam optical system for recovering 12, a cure optical system 13, a disc rotation angle detecting optical system 14, and a rotary motor 50. An optical information recording medium 1 can be rotated by the rotary motor 50.

The pickup 11 emits a reference beam and a signal beam to the optical information recording medium 1 and records digital information into a recording medium by using holography. In this case, an information signal to be recorded is transmitted, to a spatial light modulator in the pickup 11, by a controller 89 and through a signal generation circuit 86 and a signal beam is modulated by the spatial light modulator.

In a case of recovering the information recorded in the optical information recording medium 1, a light wave to make a reference beam, which is emitted from the pickup 11, incident to the optical information recording medium in a direction opposite to the direction during the recording is generated in the reference beam optical system for recovering 12. A recovered beam recovered by a reference beam for recovering is detected by a photodetector in the pickup 11 and a signal is recovered in a signal processing circuit 85. The photodetector will be described later.

The exposure time of the reference beam and the signal beam emitted to the optical information recording medium 1 can be adjusted by controlling open/close time of a shutter in the pickup 11 through a shutter control circuit 87 and by the controller 89.

The cure optical system 13 generates an optical beam used for pre-cure and post-cure of the optical information recording medium 1. The pre-cure is a preceding process to emit a predetermined optical beam in advance before emitting a reference beam and a signal beam to an intended position when information is recorded into the intended position in the optical information recording medium 1. The post-cure is a post-process, after information is recorded into an intended position in the optical information recording medium 1, to emit a predetermined optical beam to the intended position in order to prevent additional recording into the intended position.

The disc rotation angle detecting optical system 14 is used to detect a rotation angle of the optical information recording medium 1. In a case of adjusting the optical information recording medium 1 to a predetermined rotation angle, a signal corresponding to a rotation angle is detected by the disc rotation angle detecting optical system 14 and the rotation angle of the optical information recording medium 1 is controlled, by using a detected signal, by the controller 89 and through a disc rotating motor control circuit 88.

A light source driving circuit 82 supplies a predetermined light source driving current to a light source in each of the pickup 11, the cure optical system 13, and the disc rotation angle detecting optical system 14. Each light source can emit an optical beam of a predetermined light quantity.

Also, to each of the pickup 11 and the cure optical system 13, a mechanism which can slide a position of the optical information recording medium 1 in a radial direction is provided. Position control is performed through an access control circuit 81.

Incidentally, in a recording technique which uses a principle of angle multiplexing of holography, an allowable error for deviation in an angle of a reference beam tends to be extremely small.

Thus, it becomes necessary to provide, in the pickup 11, a mechanism to detect a deviation amount of the angle of a reference beam and to include, in the optical information recording/recovering apparatus 10, a servo mechanism to generate a servo controlling signal in a servo signal generation circuit 83 and to correct the deviation amount through a servo control circuit 84.

Also, the pickup 11, the cure optical system 13, and the disc rotation angle detecting optical system 14 may be simplified by integrating a part or all of optical system configurations.

Figure 3:
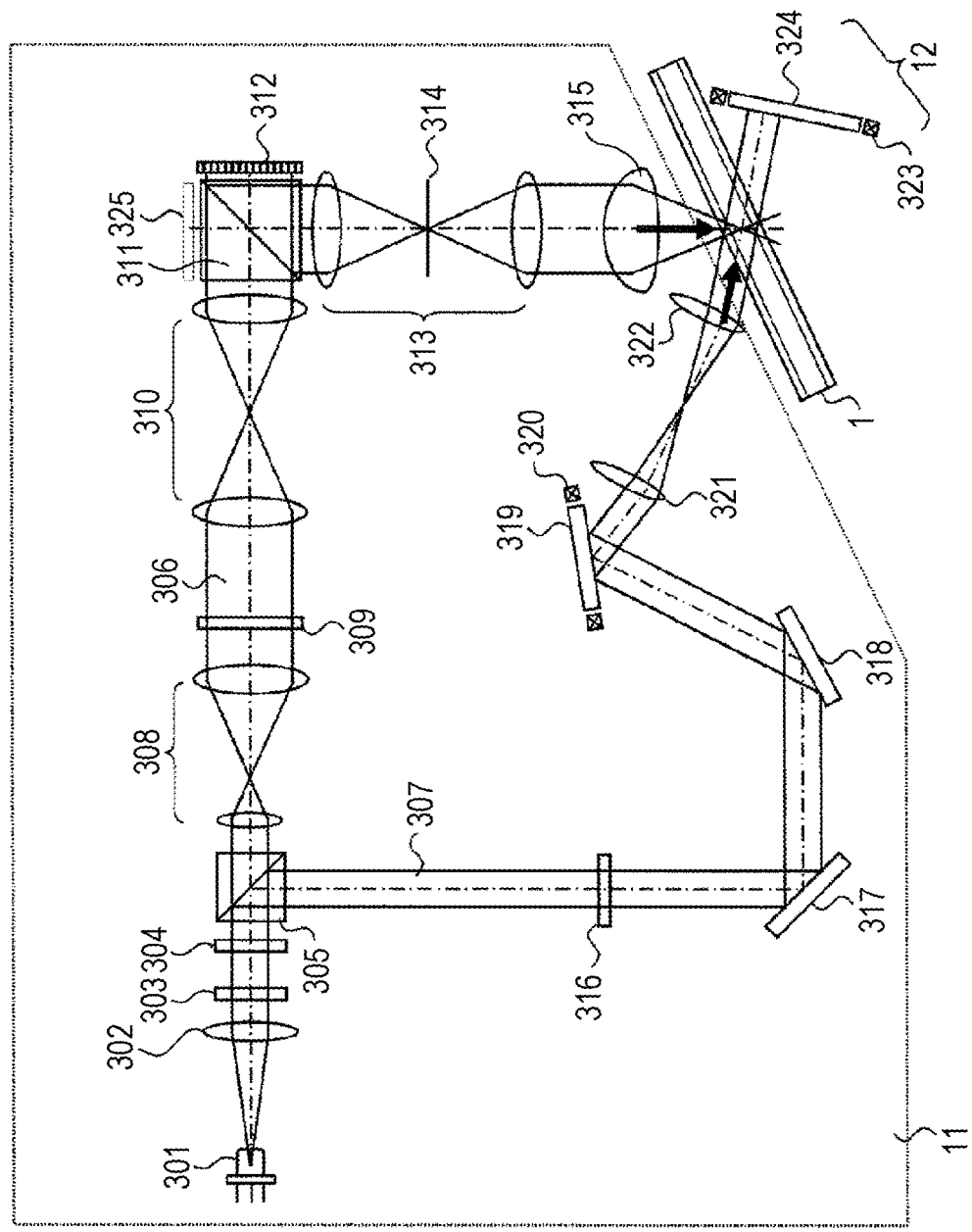
FIG. 3 is a schematic view illustrating an embodiment of a pickup in the optical information recording/recovering apparatus.

In FIG. 3, a recording principle in an example of a basic optical system configuration of the pickup 11 in the optical information recording/recovering apparatus 10 is illustrated. An optical beam emitted from a light source 301 is transmitted through a collimator lens 302 and become incident to a shutter 303. When the shutter 303 is open, the optical beam passes through the shutter 303. Then, after a polarization direction is controlled, by an optical element 304 including, for example, a ½-wavelength plate, in such a manner that a light quantity ratio of p-polarization to s-polarization becomes an intended ratio, the optical beam becomes incident to a polarization beam splitter (PBS) prism 305.

The optical beam transmitted through the PBS prism 305 functions as a signal beam 306. After an optical beam diameter is expanded by a beam expander 308, the optical beam is transmitted through a phase mask 309, a relay lens 310, and a PBS prism 311 and becomes incident to a spatial light modulator 312.

A signal beam to which information is added by the spatial light modulator 312 is reflected from the PBS prism 311 and propagates through a relay lens 313 and a spatial filter 314. Then, the signal beam is collected to the optical information recording medium 1 by an objective lens 315.

On the other hand, the optical beam reflected from the PBS prism 305 functions as a reference beam 307. After being set to a predetermined polarization direction by a polarization direction conversion element 316 in response to recording or recovering, the optical beam becomes incident to a galvano mirror 319 through a mirror 317 and a mirror 318. Since an angle of the galvano mirror 319 can be adjusted by an actuator 320, an angle of incidence of the reference beam, which becomes incident to the optical information recording medium 1 after passing through a lens 321 and a lens 322, can be set to an intended angle. Note that an element to convert a wave front of the reference beam may be used instead of the galvano mirror to set the angle of incidence of the reference beam.

In such a manner, by making the signal beam and the reference beam become incident to the optical information recording medium 1 in an overlapped manner, an interference pattern is formed in the recording medium and information is recorded by writing this pattern into the recording medium. Also, since the angle of incidence of the reference beam which becomes incident to the optical information recording medium 1 can be changed by the galvano mirror 319, recording by angle multiplexing is possible.

Hereinafter, in holograms recorded in the same region with different angles of a reference beam, a hologram corresponding to each angle of a reference beam will be called a page and a set of pages angle-multiplexed in the same region will be called a book.

Figure 4:
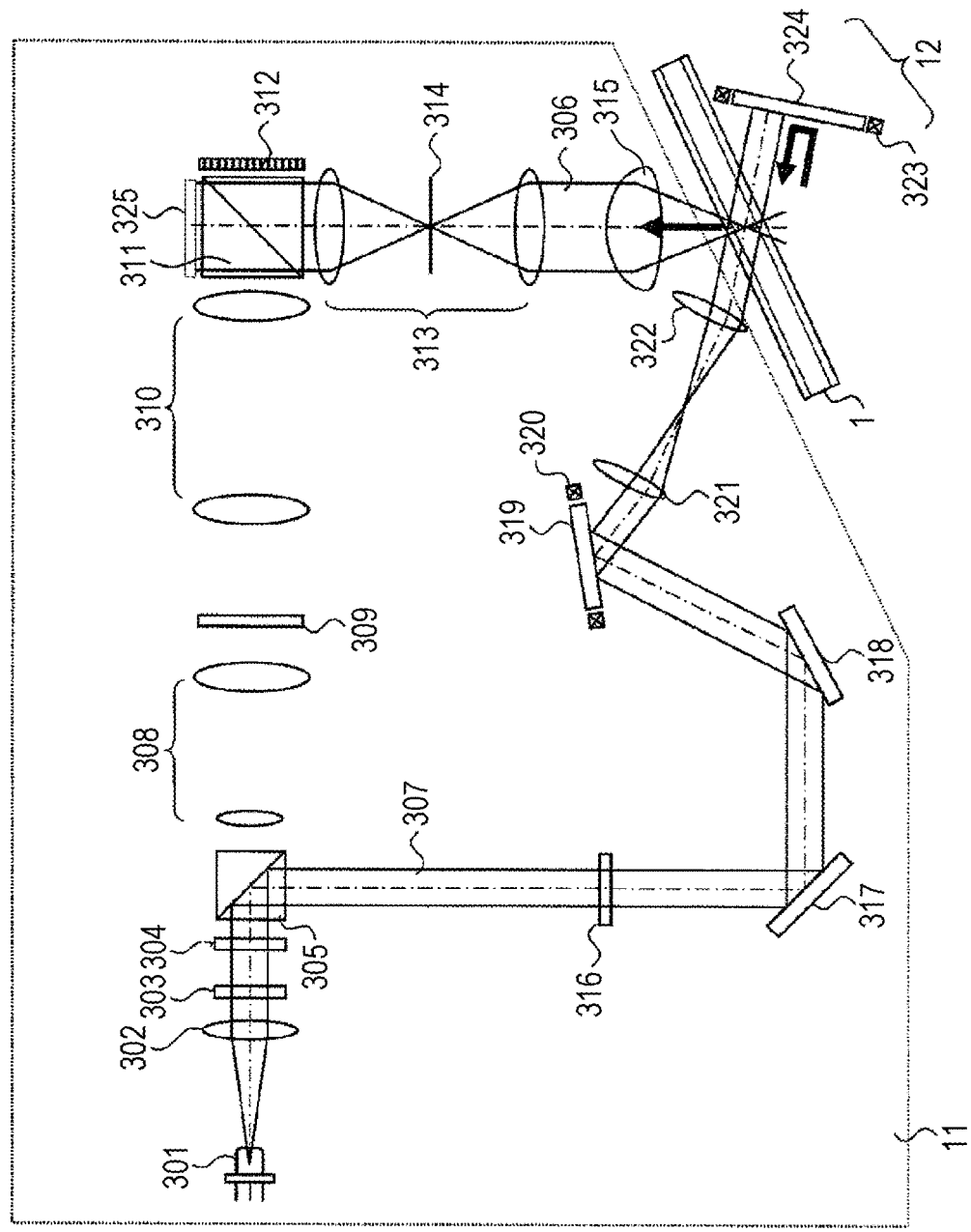
FIG. 4 is a schematic view illustrating an embodiment of the pickup in the optical information recording/recovering apparatus.

In FIG. 4, a recovering principle in an example of the basic optical system configuration of the pickup 11 in the optical information recording/recovering apparatus 10 is illustrated. In a case of recovering recorded information, as described above, a reference beam is made incident to the optical information recording medium 1 and an optical beam transmitted through the optical information recording medium 1 is reflected from a galvano mirror 324 an angle of which can be adjusted by an actuator 323, whereby a reference beam for recovering is generated.

A recovered beam recovered by this reference beam for recovering propagates through the objective lens 315, the relay lens 313, and the spatial filter 314. Then, the recovered beam is transmitted through the PBS prism 311 and becomes incident to a photodetector 325, and thus, a recorded signal can be recovered. As the photodetector 325, for example, an imaging element such as a CMOS image sensor or a CCD image sensor can be used. However, any kind of element can be used as long as page data can be recovered.

Figure 6A:
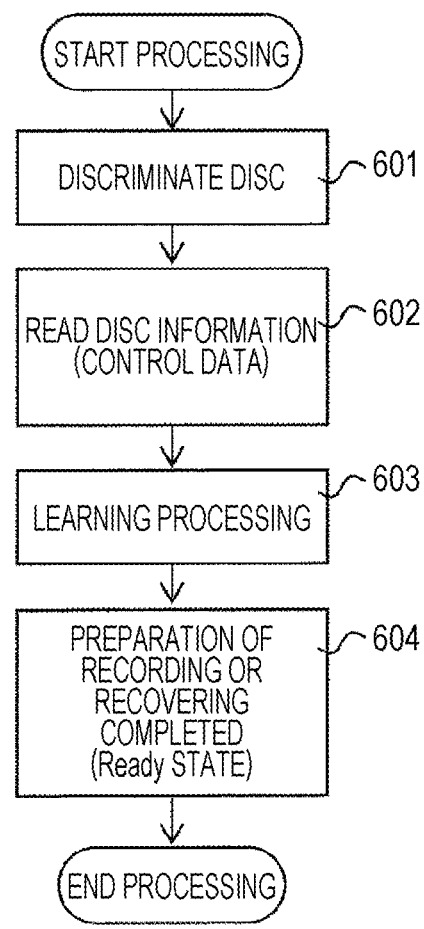
FIG. 6A is a flowchart illustrating an operation of the optical information recording/recovering apparatus.
Figure 6B:
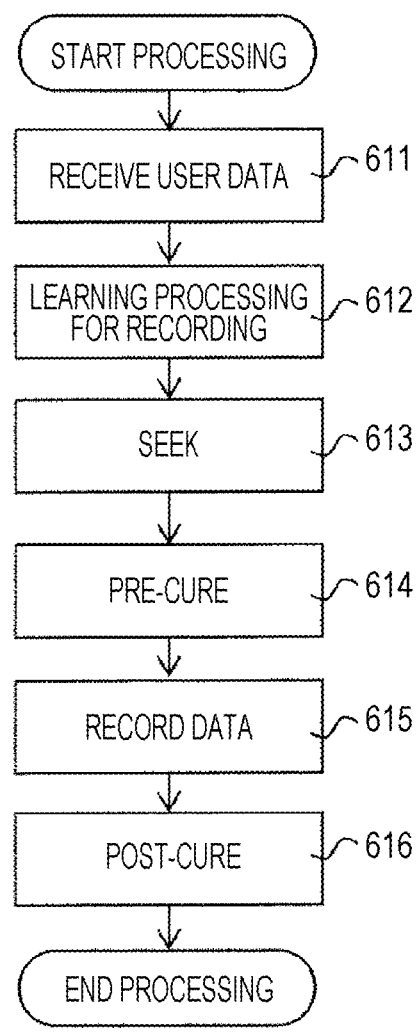
FIG. 6B is a flowchart illustrating an operation of the optical information recording/recovering apparatus.
Figure 6C:
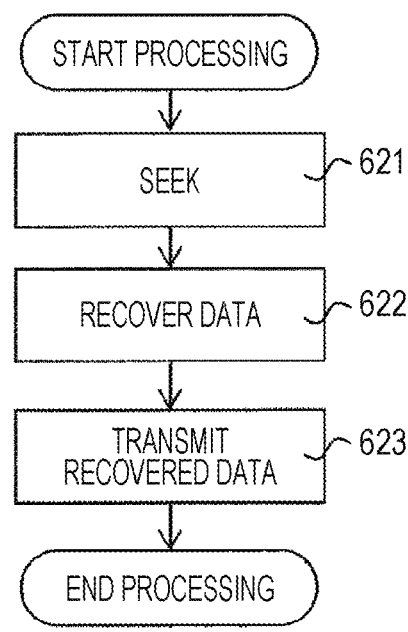
FIG. 6C is a flowchart illustrating an operation of the optical information recording/recovering apparatus.

In each of FIG. 6A to FIG. 6C, an operation flow of recording and recovering in the optical information recording/recovering apparatus 10 is illustrated. Here, specifically, a flow related to recording/recovering in which holography is used will be described.

In FIG. 6A, an operation flow after the optical information recording medium 1 is inserted into the optical information recording/recovering apparatus 10 and until preparation of recording or recovering is completed is illustrated. In FIG. 6B, an operation flow from a preparation completed state and until information is recorded into the optical information recording medium 1 is illustrated. In FIG. 6C, an operation flow from a preparation completed state and until the information recorded into the optical information recording medium 1 is recovered is illustrated.

As illustrated in FIG. 6A, when a medium is inserted, the optical information recording/recovering apparatus 10 Performs disc discrimination and discriminates, for example, whether the inserted medium is a medium to record or recover digital information by using holography (601).

As a result of the disc discrimination, when it is determined that the inserted medium is an optical information recording medium which records or recovers digital information by using holography, the optical information recording/recovering apparatus 10 reads control data provided to the optical information recording medium (602) and acquires, for example, information related to the optical information recording medium or information related to various setting conditions in recording or recovering.

After the control data is read, learning processing related to various adjustments, which correspond to the control data, and the pickup 11 is performed (603) and preparation of recording or recovering in the optical information recording/recovering apparatus 10 is completed (604).

As illustrated in FIG. 6B, in the operation flow from the preparation completed state and until information is recorded, first, data to be recorded is received (611) and information corresponding to the data is transmitted to the spatial light modulator 312 in the pickup 11.

Then, in order to make it possible to record high-quality information into the optical information recording medium, when necessary, various kinds of learning processing for recording is performed in advance (612), the learning processing being, for example, optimizing power of the light source 301 or optimizing exposure time by the shutter 303.

Then, in a seeking operation (613), the access control circuit 81 is controlled and a position of each of the pickup 11 and the cure optical system 13 is placed to a predetermine position in the optical information recording medium. In a case where the optical information recording medium 1 includes address information, the address information is recovered and it is checked whether placement to an intended position is performed. When arrangement to the intended position is not performed, a deviation amount from the predetermined position is calculated and placement operation is repeated.

Then, a predetermined region is pre-cured by using an optical beam emitted from the cure optical system 13 (614) and data is recorded by using a reference beam and a signal beam emitted from the pickup 11 (615).

After the data is recorded, post-cure is performed by using the optical beam emitted from the cure optical system 13 (616). When necessary, the data may be verified.

As illustrated in FIG. 6C, in the operation flow from the preparation completed state and until the stored information is recovered, first, in the seeking operation (621), the access control circuit 81 is controlled and a position of each of the pickup 11 and the reference beam optical system for recovering 12 is placed to a predetermined position in the optical information recording medium. In a case where the optical information recording medium 1 includes address information, the address information is recovered and it is checked whether placement to an intended position is performed. When arrangement to the intended position is not performed, a deviation amount from the predetermined position is calculated and placement operation is repeated.

Then, a reference beam is output from the pickup 11 and information recorded into the optical information recording medium is read (622), and then, recovered data is transmitted (623).

Figure 9A:
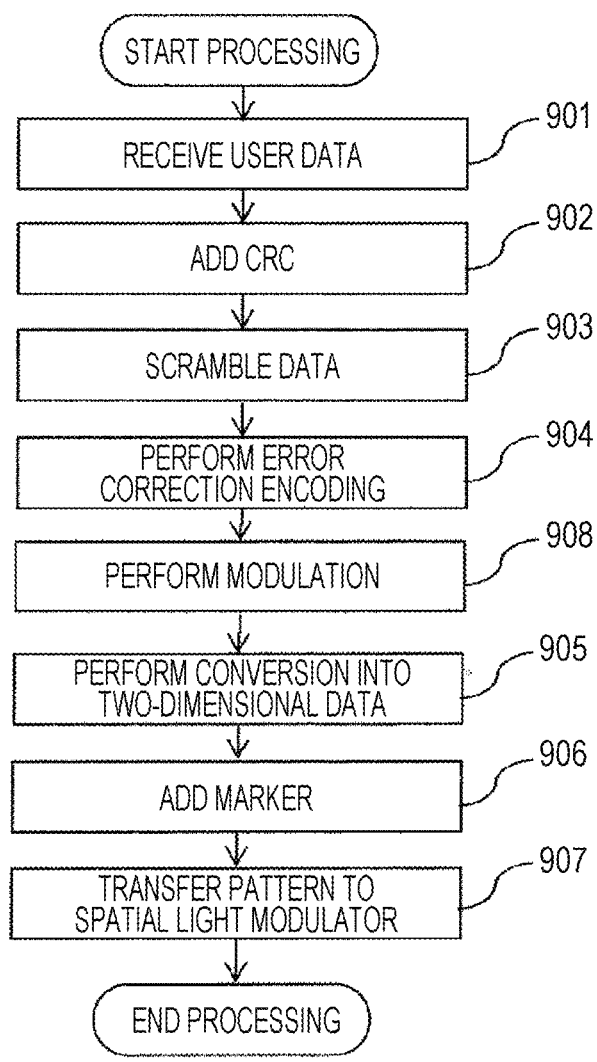
FIG. 9A is a flowchart illustrating an operation of the signal generation circuit.
Figure 9B:
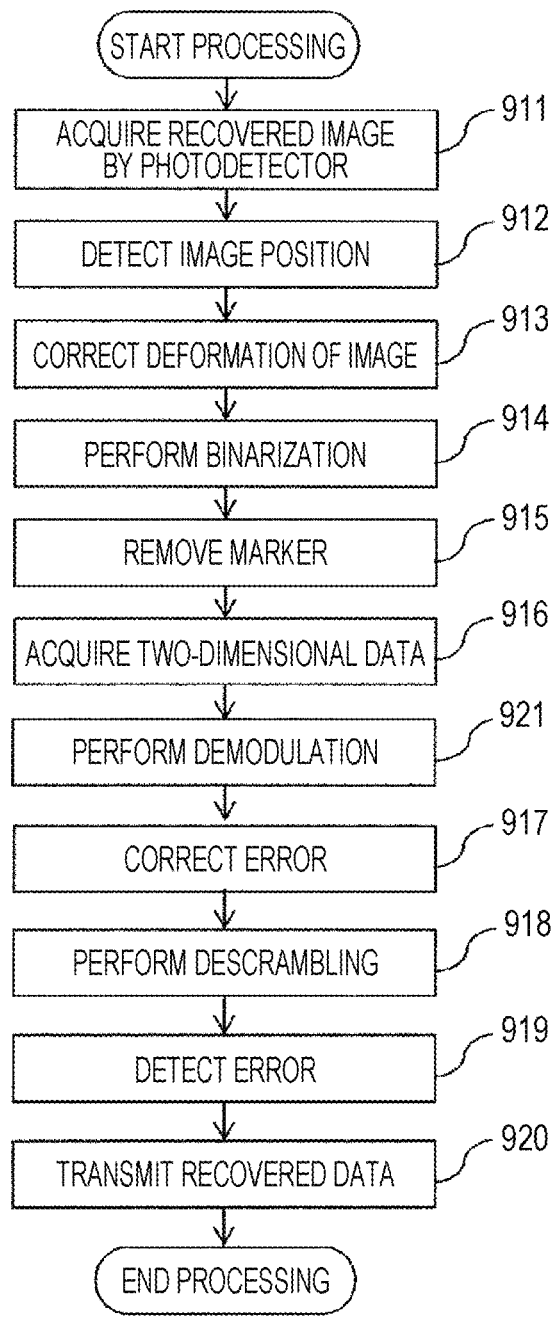
FIG. 9B is a flowchart illustrating an operation of the signal generation circuit.

In FIG. 9A and FIG. 9B, data processing flows during the recording and recovering are illustrated. In FIG. 9A, a user data processing flow in the signal generation circuit 86 after the user data reception processing 611 in the input/output control circuit 90 and until conversion into two-dimensional data on the spatial light modulator 312 is performed is illustrated. In FIG. 9B, a recovered data processing flow in the signal processing circuit 85 after the two-dimensional data is detected by the photodetector 325 and until recovered data transmission processing 623 in the input/output control circuit 90 is performed is illustrated.

With reference to FIG. 9A, data processing during the recording will be described. When user data is received (901), the user data is divided into a plurality of data sequences and each data sequence is converted into a CRC in order to make it possible to perform error detection during the recovering (902). Then, after the number of on pixels and the number of off pixels are made substantially the same and scrambling to add a pseudo-random number data sequence to the data sequence is performed in order to prevent repetition of the same pattern (903), error correction encoding such as Reed-Solomon encoding is performed (904) to make it possible to perform error correction during the recovering, and data is modulated into a format suitable for a transmission characteristic of recording/recovering by using holography (908). Next, the modulated data sequence and a data pattern in an external region described later are converted into two-dimensional data and two-dimensional data of one page is configured by repeating the conversion of data of the one page (905). Detail operations of this modulation 908 and the conversion into two-dimensional data 905 will be described later. To the two-dimensional data configured in such a manner, a marker which becomes reference in image position detection or image deformation correction during the recovering is added (906) and data is transferred to the spatial light modulator 312 (907).

Then, with reference to FIG. 9B, a data processing flow during the recovering will be described. The image data detected by the photodetector 325 is transferred to the signal processing circuit 85 (911). With the marker included in this image data as reference, an image position is detected (912). After deformation of an image such as inclination, magnification, or distortion is corrected (913), binarization processing is performed (914) and the marker is removed (915). Thus, two-dimensional data of one page is acquired (916) and demodulation is performed (921). Then, after the demodulated two-dimensional data is converted into a plurality of data sequences, error correction processing is performed (917) and a parity data sequence is removed. Then, descrambling processing is performed (918) and error detection processing by the CRC is performed (919). After CRC parity is deleted, user data is transmitted through the input/output control circuit 90 (920).

Figure 7:
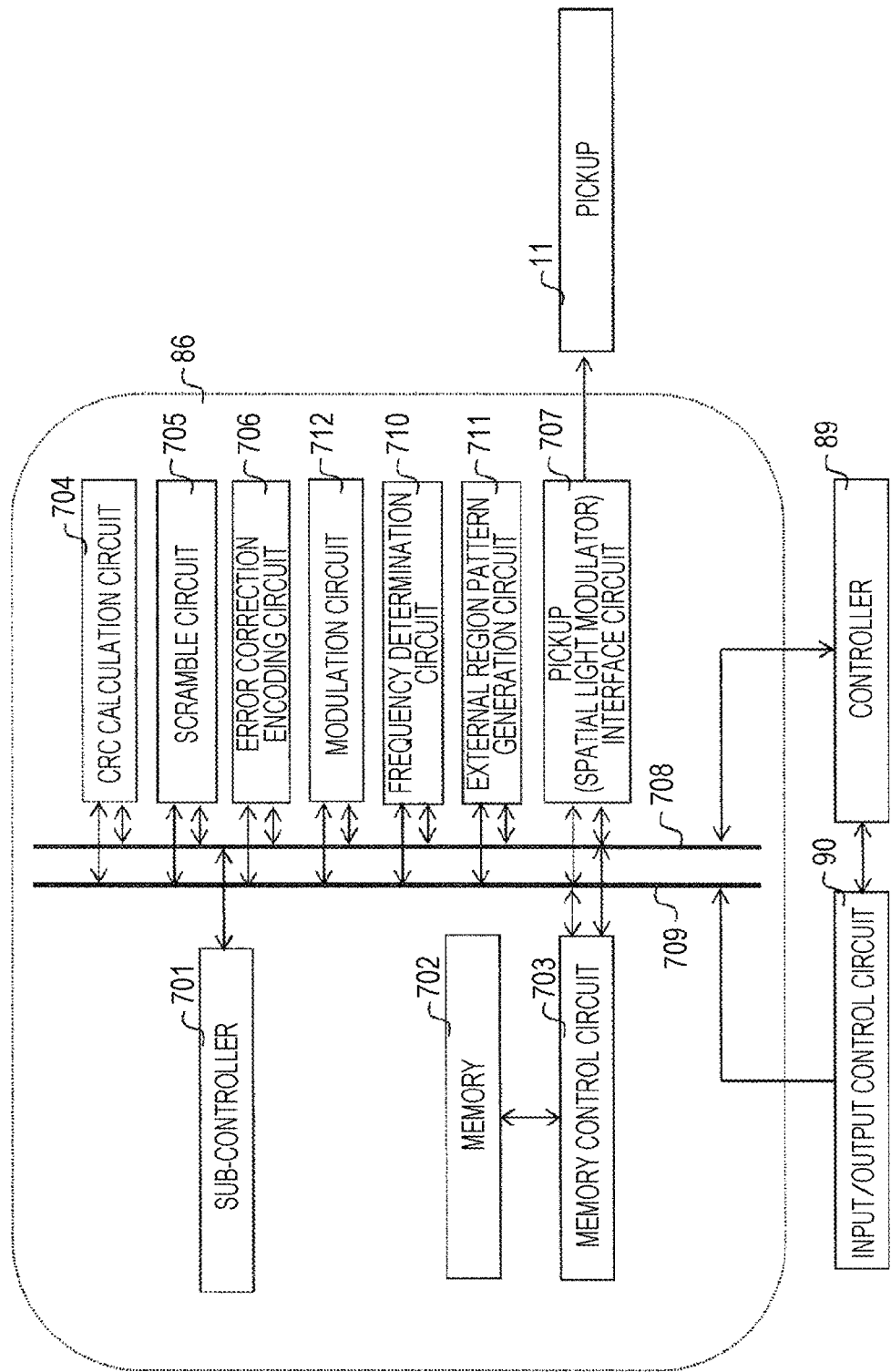
FIG. 7 is a schematic view illustrating an embodiment of a signal generation circuit in the optical information recording/recovering apparatus.

FIG. 7 is a block diagram of the signal generation circuit 86 of the optical information recording/recovering apparatus 10.

When input of the user data into the input/output control circuit 90 is started, the input/output control circuit 90 notifies the controller 89 that the input of the user data is started. The controller 89 receives this notification and instructs the signal generation circuit 86 to perform recording processing of data of one page, the data being input from the input/output control circuit 90. The processing instruction from the controller 89 passes through a control line 708 and is notified to a sub-controller 701 in the signal generation circuit 86. When receiving this notification, the sub-controller 701 controls, through the control line 708, signal processing circuits to operate in parallel. First, a memory control circuit 703 is controlled to store, into a memory 702, the user data input from the input/output control circuit 90 through a data line 709. When the user data stored into the memory 702 reaches a certain amount, a CRC calculation circuit 704 is controlled to convert the user data into a CRC. Then, a control to perform, on the data converted into the CRC, scrambling to add a pseudo-random number data sequence in a scramble circuit 705 and error correction encoding to add a parity data sequence in an error correction encoding circuit 706 is performed. Then, the data on which the error correction encoding is performed is modulated in a modulation circuit 712. Detail of a modulation method will be described later. Then, a frequency determination circuit 710 is controlled to determine, from a modulation method, a frequency of the two-dimensional data and an external region pattern generation circuit 711 is controlled to generate a data pattern of an external region, which will be described later, according to a result of the frequency determination. Detail of a method for generating the data pattern of the external region will be described later. Then, the memory control circuit 703 is controlled to store the generated data pattern of the external region into the memory 702 through the data line 709. Finally, a pickup interface circuit 707 is made to read, from the memory 702, the data on which the error correction encoding is performed and the data pattern of the external region in a sequence order of the two-dimensional data on the spatial light modulator 312. After a marker which becomes reference during the recovering is added, the two-dimensional data is transferred to the spatial light modulator 312 in the pickup 11.

Figure 8:
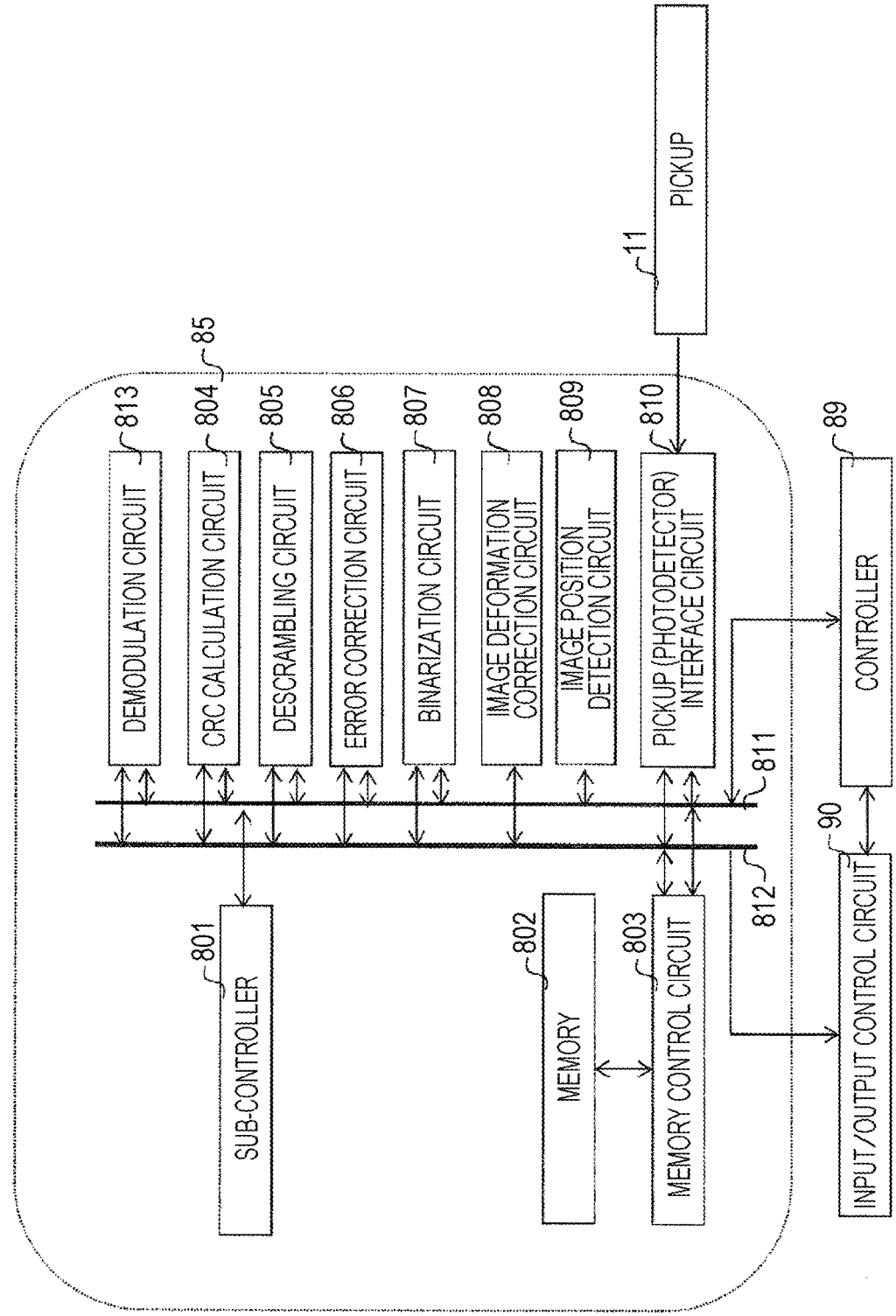
FIG. 8 is a schematic view illustrating an embodiment of a signal processing circuit in the optical information recording/recovering apparatus.

FIG. 8 is a block diagram of the signal processing circuit 85 of the optical information recording/recovering apparatus 10.

When the photodetector 325 in the pickup 11 detects an image data, the controller 89 instructs the signal processing circuit 85 to perform recovering processing of data of one page, the data being input from the pickup 11. The processing instruction from the controller 89 passes through a control line 811 and is notified to a sub-controller 801 in the signal processing circuit 85. When receiving this notification, the sub-controller 801 controls, through the control line 811, signal processing circuits to operate in parallel. First, a memory control circuit 803 is controlled to store, into a memory 802, the image data input from the pickup 11 through a pickup interface circuit 810 and a data line 812. When the data stored into the memory 802 reaches a certain amount, an image position detection circuit 809 is controlled to detect a marker from the image data stored into the memory 802 and to extract an effective data range. Then, an image deformation correction circuit 808 is controlled to perform, by using the detected marker, correction of deformation of an image such as inclination, magnification, or distortion and conversion of a size of the image data into an expected size of the two-dimensional data. A control in which each piece of bit data of a plurality of bits which configures the two-dimensional data, the size of which is converted, is binarized in a binarization circuit 807 to perform "0" or "1" determination and the data is stored into the memory 802 in a sequence order of the output of the recovered data is performed. Then, after demodulation of each data sequence is performed in a demodulation circuit 813 and an error included in the demodulated data sequence is corrected in an error correction circuit 806, and after the scramble to add a pseudo-random number data sequence is descrambled in a descrambling circuit 805, a CRC calculation circuit 804 checks that the user data in the memory 802 does not include an error. Then, the user data is transferred from the memory 802 to the input/output control circuit 90.

Here, a data pattern of the external region will be described in detail.

Figure 1:
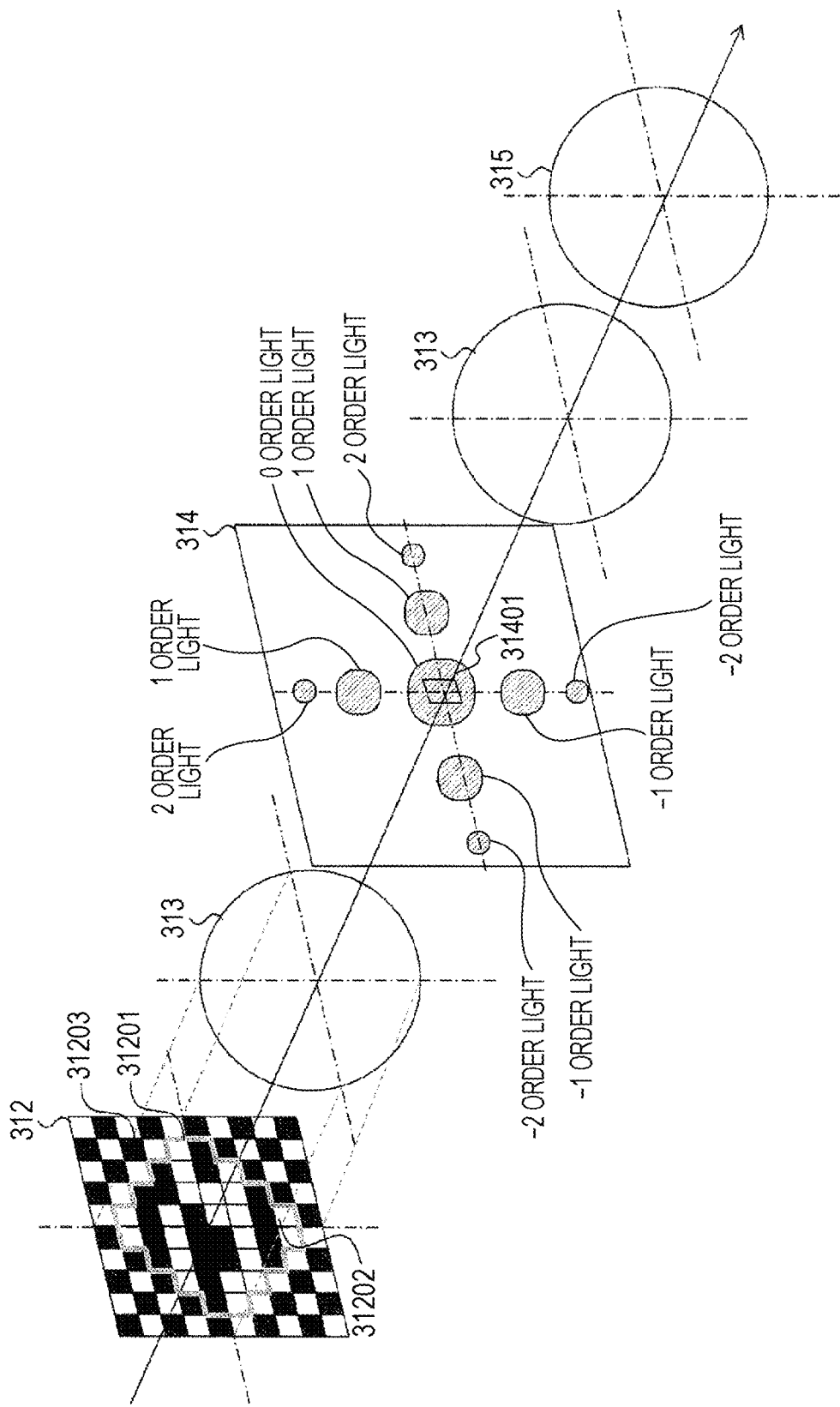
FIG. 1 is a conceptual view of an operation of an optical information recording/recovering apparatus according to the present invention.

FIG. 1 is a conceptual view illustrating an optical system configuration from the spatial light modulator 312 to the objective lens 315 in an optical path during the recording in FIG. 3 and a shape of a signal beam collected to a focal position of the relay lens 313.

Generally, since the objective lens 315 includes a substantially circular shape, two-dimensional data displayed on the spatial light modulator 312 preferably includes a substantially circular shape such as a shape of a signal region 31202 surrounded by a region boundary line 31201. However, since the spatial light modulator 312 is generally quadrangle, there is an external region 31203, which is a region to display two-dimensional data not leastwise including user data, on the spatial light modulator. With FIG. 1 as an example, the external region 31203 is a region other than the signal region 31202 on the spatial light modulator. Note that to the signal region 31202, for example, two-dimensional data other than the user data, such as header information including a page number or the like may be displayed.

Recording of data is performed by polymerizing a photosensitive monomer of the optical information recording medium 1 in an interference fringe bright part of the signal beam and the reference beam. The number of photosensitive monomers is a value unique to an information recording medium and is finite. Thus, when an external beam reaches the optical information recording medium 1, a photosensitive monomer to record an interference fringe is consumed unnecessarily and the amount of data which can be recorded into the optical information recording medium 1 is reduced. As a result, recording capacity is reduced. Thus, to perform recording of larger capacity, it is necessary to block or suppress the external beam to prevent a hologram disc from being exposed.

On the other hand, when a signal beam in a case where the two-dimensional data is displayed on the spatial light modulator 312 is collected with the relay lens 313, 0 order light, ±1 order light, and ±2 order light serially line up in two directions orthogonal to each other. Intensity of the signal beam which has passed through the relay lens 313 becomes a frequency distribution at the focal position of the relay lens and has a high frequency wave according to a distance from a center of an optical axis of the relay lens 313. By using this characteristic, the external beam is blocked or suppressed.

That is, a data pattern displayed on the external region 31203 is made to have higher frequency wave than a data pattern displayed on the signal region 31202. In such a manner, at the focal position of the relay lens 313, the external beam is distributed around the reflected beam from the signal region 31202. Thus, by using the spatial filter 314 mounted to a neighborhood of the focal position of the relay lens 313, a frequency component exceeding the frequency of the reflected beam from the signal region 31202 is blocked. In such a manner, only the external beam can be blocked.

Here, in the embodiment in FIG. 1, the signal region 31202 is arranged to the spatial light modulator 312 in such a manner that one pixel remains in each of the up, down, right, and left directions, but the present invention is not limited thereto. An arrangement of the signal region 31202 depends on the objective lens 315 or the like. Depending on the objective lens 315, the signal region 31202 may be arranged in such a manner that a several pixels remain in each of the up, down, right, and left directions. Also, the signal region 31202 may be arranged in a manner shifted to any one of the up, down, right, and left directions of the spatial light modulator 312 instead of being arranged to a center thereof. Also, when an optical axis of the objective lens 315 and an optical axis of the signal region 31202 are deviated from each other due to change with time, an axis deviation may be corrected by changing a display region of the signal region 31202 in the spatial light modulator 312 by using the external region 31203. To realize the correction of an axis deviation in this manner, it becomes necessary to prevent image persistence even in the external region 31203 not including user data.

Figure 10:
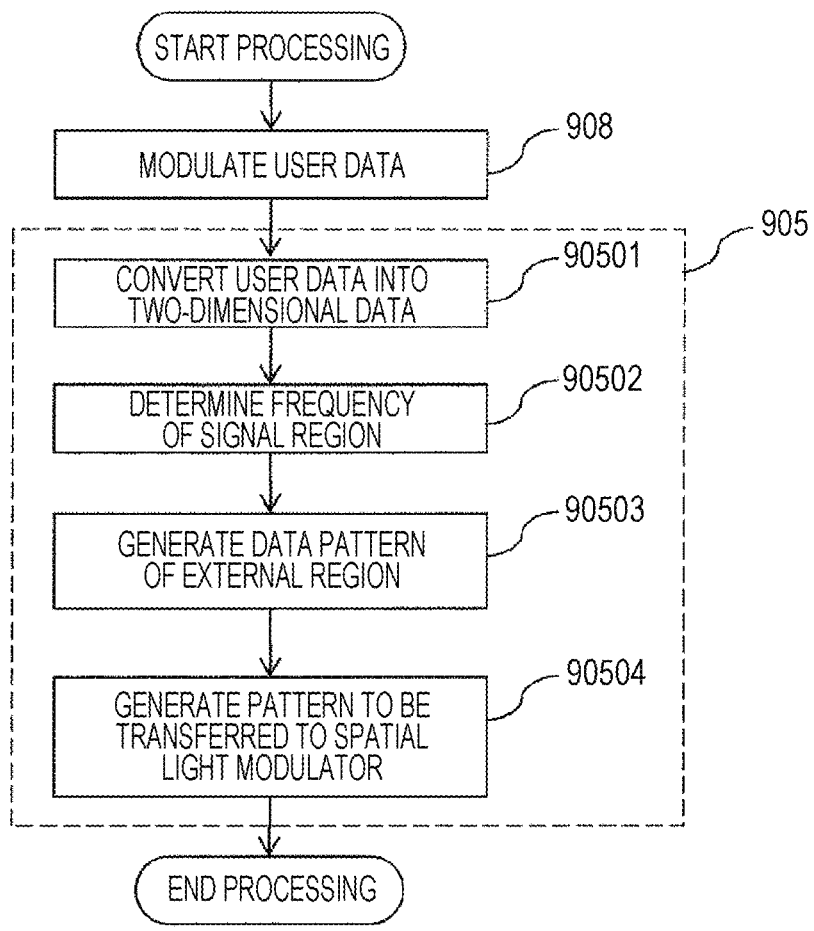
FIG. 10 is a flowchart illustrating an operation of the signal generation circuit and the signal processing circuit.

With reference to FIG. 10, a modulation method during the recording and a detail operation flow of the conversion into two-dimensional data 905 including the signal region 31202 and the external region 31203 will be described.

To the data on which the error correction encoding such as the Reed-Solomon encoding is performed, modulation processing is performed (908). In the present embodiment, a modulation method is not limited. However, the modulation performed in 908 is, for example, a modulation method, in which the number of successive on/off pixels displayed on the signal region 31202 is prescribed in advance, such as run-length limited coding (RLL).

Next, with reference to processing 90501 to 90504, a detail operation of the conversion into two-dimensional data 905 will be described.

In 90501, to the modulated user data, an n×m (n and m: natural number) two-dimensional pattern is assigned for every N (N: natural number) bit and arranged in series. This operation is repeated for data of a page and two-dimensional data of one page is configured. Here, the two-dimensional data generated in 90501 is data to be recorded into an optical information medium and is displayed on the signal region 31202.

Then, the frequency determination circuit 710 determines a frequency of the two-dimensional data generated in 90501 and displayed on the signal region 31202 (90502). The frequency of a data pattern displayed on the spatial light modulator 312 depends on the number of successive arrayed on/off pixels. The larger the number of successive pixels is, the lower the frequency wave becomes. That is, a data pattern of one isolated pixel has the highest frequency. According to the modulation performed in 908, a lower limit of the number of successive on/off pixels in the signal region 31202 is a known value. In 90502, the number of successive on/off pixels of the two-dimensional data is determined, the number being prescribed by a modulation format. Here, a result of the determination may be fixed by the known value and utilized. Alternately, determination may be performed by reading modulation rule information by the controller 89 or the optical information recording medium 1, or determination may be performed by calculating from the data itself after the modulation. Also, a frequency of the data is determined, from the number of successive on/off pixels, by using the on/off-binary spatial light modulator 312 but a method for determining a frequency of the data in the present invention is not limited thereto. For example, in a case of using a multi-valued spatial light modulator 312, determination may be performed, for example, from the data itself after the modulation, as it has been described above. The multi-valued spatial light modulator 312 is, for example, three-valued or more.

Figure 11:
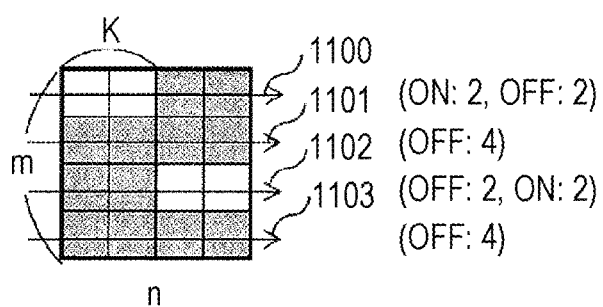
FIG. 11 is a view illustrating a data pattern example of a signal region.
Figure 12A:
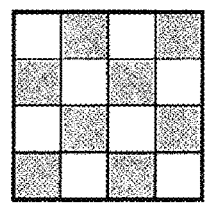
FIG. 12A and FIG. 12B are views respectively illustrating data pattern examples of an external region.
Figure 12B:
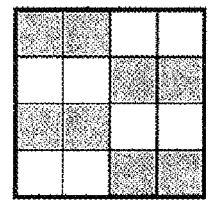
Figure 14:
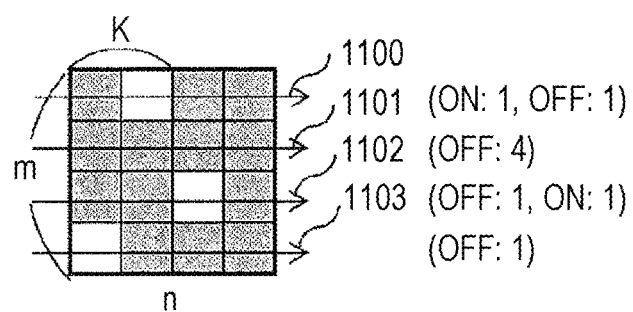
FIG. 14 is a view illustrating a data pattern example of the signal region.
Figure 15:
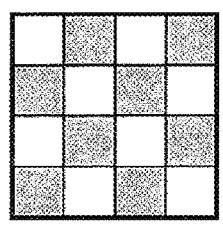
FIG. 15 is a view illustrating a data pattern example of the external region.

In 90503, according to a result of the number of successive pixels determined in 90502, a data pattern of the external region 31203 is generated. As described, since it is necessary to make the data pattern of the external region 31203 have a higher frequency wave than the data pattern of the signal region 31202, the maximum number of successive pixels of the data displayed on the external region 31203 is made equal to or smaller than the minimum value of the number of successive pixels, which is determined in 90502, on the signal region 31202. For example, as illustrated in FIG. 11, in a case where a two-dimensional data pattern is generated by a modulation format, in which the lower limit of the number of successive on/off pixels becomes two, the maximum number of successive pixels of the data pattern displayed on the external region 31203 is equal to or smaller than two. In the data pattern, for example, as illustrated in FIG. 12A, the maximum number of successive pixels becomes one, or as illustrated in FIG. 12B, the maximum number of successive pixels becomes two. Also, for example, as illustrated in FIG. 14, in a case where a two-dimensional data pattern is generated by a modulation format, in which the lower limit of the number of successive on/off pixels becomes one, the maximum number of successive pixels of the data pattern displayed on the external region 31203 becomes one. For example, as illustrated in FIG. 15, in the data pattern, the maximum number of successive pixels becomes one.

However, the data pattern of the external region 31203 according to the present embodiment is not limited these examples. For example, the data pattern of the external region 31203 may be generated in such a manner that the average frequency of the data patterns displayed on the external region 31203 becomes higher than the average frequency of the data patterns displayed on the signal region 31202. Alternatively, the minimum value of the number of successive pixels of the data displayed on the external region 31203 may be equal to or smaller than the minimum value of the number of successive pixels, which is determined in 90502, on the signal region 31202. Alternatively, not depending on a result of the determination in 90502, the data pattern of the external region 31203 may be a data pattern having the maximum frequency among data patterns which can be displayed on the spatial light modulator 312.

In respect to the method for generating the data pattern of the external region 31203, in a case where the maximum number of successive pixels on the external region 31203 is smaller than the minimum value of the number of successive pixels, which is determined in 90502, on the signal region 31202, a frequency of the data on the signal region 31202 and that of the data on the external region 31203 can be separated completely. Thus, it is possible to block the external beam by the spatial filter 314, but the external beam may not be blocked in other cases. However, by making the frequency of the data pattern displayed on the external region 31203 averagely higher than that displayed on the signal region 31202, most of the external beam is distributed around the reflected beam or transmitted beam from the signal region 31202 at the focal point of the relay lens 313, it is possible to suppress the external beam. Thus, by making the frequency of the data pattern displayed on the signal region 31202 equal to or lower than the frequency of the data pattern displayed on the external region 31203, consumption of a photosensitive monomer is suppressed and recording of larger capacity can be realized.

In the determination of a frequency of the signal region in 90502, the number of successive pixels in only one direction is determined. However, determination of a frequency may be performed in a direction orthogonal to 1100 to 1103 or determination of a frequency may be performed by determining the number of successive pixels in both of the directions to generate the data pattern of the external region 31203.

In 90504, a data pattern, which is generated in 90501, of the signal region 31202 and a data pattern, which is generated in 90503, of the external region 31203 are generated as data patterns transferred to the spatial light modulator 312.

Here, a size of the spatial filter 314 to block the external beam will be described.

Generally, in a case where a signal beam from the spatial light modulator 312 is collected to a lens of a focal distance f, a Nyquist size of the signal beam at a focal position is expressed in Equation 1.

$$L = f \cdot \lambda / \Delta \quad \text{(Equation 1)}$$

L: Nyquist size on Fourier plane
f: focal distance of objective lens (315 in FIG. 3)
λ: wavelength of light source (301 in FIG. 3)
Δ: pixel size of spatial light modulator (312 in FIG. 3)

Here, as a result of the processing in 90502, in a case where the lower limit of the number of successive on/off pixels of the two-dimensional data pattern displayed on the signal region 31202 is K, the substantive pixel size becomes K times of Δ. Thus, the Nyquist size at the focal position of the relay lens 313 is 1/K times of what is expressed in Equation 1. With the upper limit of the number of successive on/off pixels of the two-dimensional data pattern displayed on the external region 31203 being equal to or lower than K, the external light is distributed, at the focal position of the relay lens 313, around the signal beam. Thus, a preferable size of a spatial filter in this case is expressed in Equation 2.

$$L = (f \cdot \lambda) / (K \cdot \Delta) \quad \text{(Equation 2)}$$

Actually, there is an error in attachment of the spatial filter. Thus, when the size of the spatial filter is prescribed according to Equation 2, a signal beam may be blocked. Thus, it is preferable to determine the size of the spatial filter in consideration of the error in attachment of the spatial filter. In any case, the size of the spatial filter is designed in consideration of Equation 1. For example, the size of the filter is designed in such a manner that a size of a signal beam which becomes incident to the information recording medium is limited to a size corresponding to the upper limit of the number of successive pixels of the external region.

In such a manner, by making the frequency of the two-dimensional data displayed on the external region 31203 higher than the frequency of the two-dimensional data displayed on the signal region 31202, the external beam is distributed, at a light collection point of the relay lens 313, around the reflected beam or the transmitted beam from the signal region 31202. Thus, it becomes possible to block or suppress the external beam by the spatial filter 314 and to prevent a photosensitive monomer, which is necessary for recording data, from being consumed unnecessarily, whereby recording of larger capacity becomes possible.

Note that in the present embodiment, instead of the spatial filter 314, an angle filter may be used. The angle filter is a filter having an angle characteristic, with which only the light which becomes incident at a predetermined angle is transmitted. The external beam which has passed through a collecting lens is distributed around the reflected beam or the transmitted beam from the signal region 31202. Thus, the external beam which has passed through the collecting lens is emitted to the information recording medium in such a manner that an angle of the external beam to an optical axis of the collecting lens is larger than that of the reflected beam or the transmitted beam from the signal region 31202. By using this characteristic, an angle filter is designed to block a beam having an angle larger than that of the reflected beam or the transmitted beam from the signal region 31202 and is provided right after the relay lens 313 or the objective lens 315. Thus, it becomes possible to block or suppress an external beam by using the angle filter.

Second Embodiment

Figure 5:
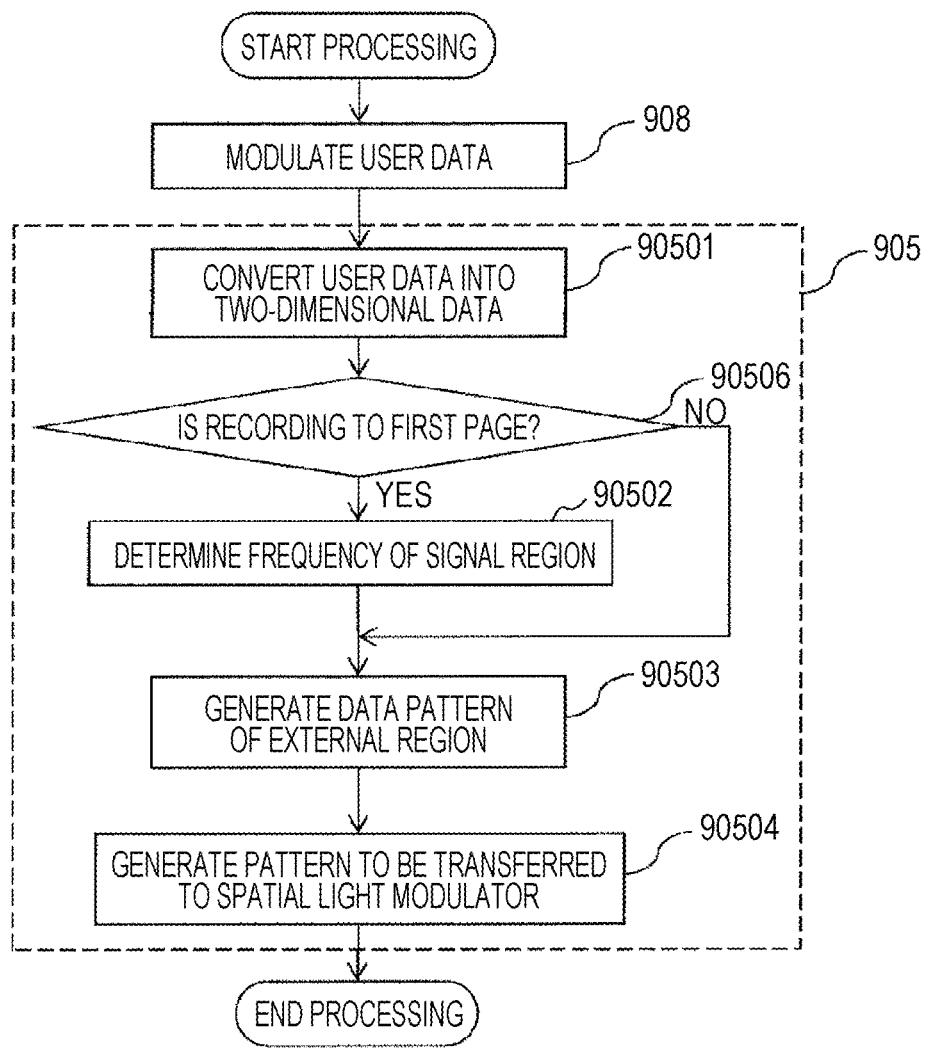
FIG. 5 is a flowchart illustrating an operation of a signal processing circuit.

In FIG. 5, processing of conversion into two-dimensional data 905 in a second embodiment is illustrated. A point different from the first embodiment is that processing 90506 is added and a method 90503 for generating a data pattern of an external region 31203 from the second time is different. Hereinafter, only the point different from the first embodiment will be described.

In 90506, in a case of recording data into a single page or a plurality of pages, it is determined whether a page to which recording is performed is a first page. In a case of the recording to the first page, processing 90503 is performed after processing 90502. When the recording is not performed to the first page, only processing 90503 is performed.

Figure 13:
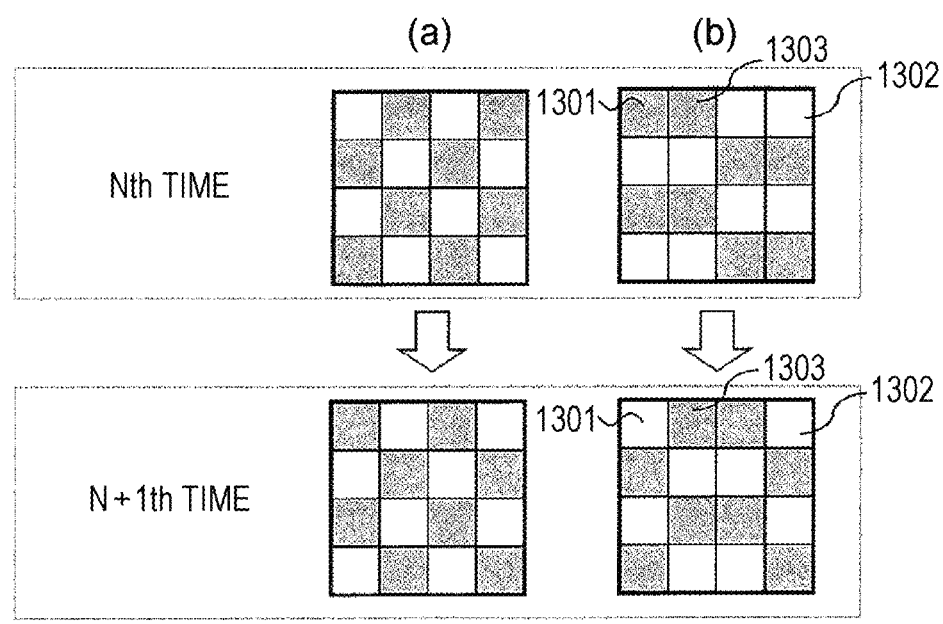
FIG. 13 is a view illustrating a data pattern example of the external region.

Generation of a data pattern of the external region, of when it is determined that the recording is not performed to the first page in 90506, in 90503 can be performed according to an already-generated data pattern of the external region. In a case where it is determined that the recording is performed to a second page or a page following the second page, for example, as illustrated in FIG. 13(*a*), a data pattern of the external region may be generated as a pattern in which on/off is reversed in each pixel of the data pattern, which is generated in the recording of the previous page, on the external region. Alternately, as illustrated in FIG. 13(*b*), a data pattern of the external region may be generated by setting an on/off state of an adjacent pixel 1301 in the data pattern of the external region in the previous page as an on/off state of a pixel 1303 in the next stage. Note that in respect to a pixel not including an adjacent pixel in any of the directions, such as the pixel 1301, an on/off state of a pixel not including an adjacent pixel in an opposite direction of an adjacent pixel missing direction of the pixel 1301, such as a pixel 1302, may be used as a state of the next page.

Here, it is assumed that the generation of a data pattern of the external region follows the previous page, but it is not necessary to generate a data pattern of the external region for each page. In a cycle in which an image persistence phenomenon does not occur in a spatial light modulator 312, the generation may be performed for each book, which includes a plurality of pages, according to the external region preceding by a several books therefrom or may be performed for every several pages according to the external region preceding by a several pages therefrom. The external region to be referred to is not limited. However, image persistence of the spatial light modulator 312 is a phenomenon which occurs in a pixel unit, and thus, a set probability of on/off of each pixel needs to be one-to-one. Thus, in respect to the generation of a data pattern of the external region 31203, it is necessary to reverse on/off of each pixel in a cycle in which image persistence does not occur with reference to the previous data pattern. According to the present embodiment, it is possible to reverse on/off of each pixel and to make the set probability of on/off of each pixel one-to-one. Note that to block or suppress the external beam, it may be considered to fix polarity of the external region turned off. Also in this case, when a coherent beam is emitted in a state in which polarity of the spatial light modulator is fixed, image persistence occurs.

As it has been described, by switching on/off of each pixel in a unit of a single page or a plurality of pages or a unit of a book, it is possible to block or suppress only the external beam while preventing image persistence of the spatial light modulator 312 and to suppress consumption of the photosensitive monomer of the optical information recording medium 1. Thus, recording of larger capacity becomes possible. Also, only by using a method described in WO-2007-111139-A to prevent image persistence of a spatial light modulator at a position of a position-determination mark, it is not possible to block or suppress the external beam, unlike the present embodiment.

Note that the present invention is not limited to the embodiments described above and includes various modifications. For example, the embodiments described above are described in detail to make it easier to understand the present invention and are not necessarily limited to include all of the described configurations. Also, it is possible to replace a part of a configuration of an embodiment with a configuration of a different embodiment and it is also possible to add a configuration of a different embodiment to a configuration of an embodiment. Also, in respect to a part of a configuration of each embodiment, it is possible to add, delete, and replace a different configuration. Also, an embodiment of the present invention is not limited to an angle multiplexing system but can be applied to a different shift multiplexing system.

Also, in the present invention, the spatial light modulator is not limited to include a quadrangular shape and the objective lens is not limited to include a circular shape, a different shape may be included. For example, en embodiment of the present invention can be applied even in a case where both of the spatial light modulator and the objective lens are circular.

In addition, a part or all of each configuration, each function, each processing unit, each kind of processing means, and the like described above may be realized in hardware, for example, by designing as an integrated circuit. Also, each configuration, function, and the like described above may be realized in software by a processor interpreting and executing a program which realizes each function. Information, such as a program, a table, a file, and the like to realize each function can be stored in a storage apparatus such as a memory, a hard disc, a solid state drive (SSD), or the like or in a storage medium such as an IC card, an SD card, a DVD, or the like.

Also, a control line and an information line, which are necessary for description, are illustrated and all of the control lines and information lines of a product may not be necessarily illustrated. Practically, it may be considered that almost all configurations are connected mutually.

What is claimed is:

1. An optical information recording apparatus configured to record information into an information recording medium by using holography, the apparatus comprising:
   a signal generation unit configured to generate two-dimensional data; and
   a two-dimensional spatial light modulator unit configured to display the two-dimensional data and to spatially modulate a transmitted or reflected beam,
   wherein the two-dimensional spatial light modulator unit includes a signal region and an external region,
   the signal region displays two-dimensional data based on user data,
   the external region displays two-dimensional data not including the user data, and
   the signal generation unit generates the two-dimensional data in such a manner that a frequency of the two-dimensional data displayed on the external region becomes equal to or larger than a frequency of the two-dimensional data displayed on the signal region.

2. The optical information recording apparatus according to claim 1, wherein the signal generation unit generates the two-dimensional data in such a manner that a lower limit M of a number of successive pixels in the external region of the two-dimensional spatial light modulator unit becomes lower than a lower limit K of a number of successive pixels in the signal region of the two-dimensional spatial light modulator unit.

3. The optical information recording apparatus according to claim 1, wherein the signal generation unit generates the two-dimensional data in such a manner that an upper limit L of a number of successive pixels in the external region of the two-dimensional spatial light modulator unit becomes equal to or lower than a lower limit K of a number of successive pixels in the signal region of the two-dimensional spatial light modulator unit.

4. The optical information recording apparatus according to claim 1, further comprising:
   a filter configured to block or suppress a signal beam corresponding to the external region; and
   an objective lens configured to collect, to an information recording medium, a signal beam which has passed through the filter.

5. The optical information recording apparatus according to claim 1, further comprising:
   a filter configured to limit a size of a signal beam, which becomes incident to an information recording medium, to a size corresponding to an upper limit L of the number of successive pixels in the external region which is generated by the signal generation unit; and
   an objective lens configured to collect, to the information recording medium, a signal beam which has passed through the filter.

6. The optical information recording apparatus according to claim 5, further comprising a collecting lens configured to collect, as the signal beam, a beam which is reflected or transmitted from the two-dimensional spatial light modulator unit,
   wherein the filter is arranged in a neighborhood of a focal position on an optical axis of the collecting lens.

7. The optical information recording apparatus according to claim 6, wherein when it is assumed that a pixel pitch of the two-dimensional spatial light modulator unit is $\Delta$, a focal distance of the collecting lens is $f$, and a wavelength of the signal beam is $\lambda$, a size of the signal beam is smaller than $(f \cdot \lambda / \Delta)$.

8. The optical information recording apparatus according to claim 1, wherein a data pattern displayed on the external region is switched for every single page or every plurality of pages.

9. The optical information recording apparatus according to claim 8, wherein, an on/off state of a pixel after the switching in the external region is a reverse of a state before the switching.

10. An optical information recording method in an optical information recording apparatus configured to record information into an information recording medium by using holography, the method comprising:
   signal generation to generate two-dimensional data; and
   two-dimensional spatial light modulation to display the two-dimensional data and to spatially modulate a transmitted or reflected beam in a two-dimensional spatial light modulator unit,
   wherein the two-dimensional spatial light modulator unit includes a signal region and an external region,
   the signal region displays two-dimensional data based on user data,
   the external region displays two-dimensional data not including the user data, and
   in the signal generation, the two-dimensional data is generated in such a manner that a frequency of the two-dimensional data displayed on the external region becomes equal to or larger than a frequency of the two-dimensional data displayed on the signal region.

11. The optical information recording method according to claim 10, wherein the two-dimensional data is generated in such a manner that an upper limit L of a number of successive pixels in the external region during the two-dimensional spatial light modulation becomes equal to or lower than a lower limit K of a number of successive pixels in the signal region during the two-dimensional spatial light modulation.

12. The optical information recording method according to claim 10, wherein the two-dimensional data is generated in such a manner that a lower limit M of a number of successive pixels in the external region during the two-dimensional spatial light modulation becomes lower than a lower limit K of a number of successive pixels in the signal region during the two-dimensional spatial light modulation.

13. The optical information recording method according to claim 10, further comprising:
   filtering, using a filter, to block or suppress a signal beam corresponding to the external region; and
   collecting to collect, to an information recording medium, a signal beam which has passed through the filter.

14. The optical information recording method according to claim 10, further comprising:
   limiting to limit a size of a signal beam, which becomes incident to an information recording medium, to a size corresponding to an upper limit L of a number of successive pixels in the external region which is generated by the signal generation unit; and
   collecting to collect, to the information recording medium, a signal beam on which the limiting is performed.

15. The optical information recording method according to claim 10, wherein an on/off state of a pixel in the external region is switched for every single page or every plurality of pages.

16. The optical information recording method according to claim 15, wherein the on/off state of the pixel after the switching in the external region is a reverse of a state before the switching.

* * * * *